United States Patent
Wiedemann et al.

(10) Patent No.: US 11,624,454 B2
(45) Date of Patent: Apr. 11, 2023

(54) FLOW RESISTANCE INSERT AND A FLOW RATE MEASURING OR FLOW RATE CONTROL MEANS

(71) Applicants: BUERKERT WERKE GMBH & CO. KG, Ingelfingen (DE); BURKERT S.A.S., Triembach-au-Val (FR)

(72) Inventors: Juergen Wiedemann, Ingelfingen (DE); Armin Arnold, Ingelfingen (DE)

(73) Assignees: BUERKERT WERKE GMBH & CO. KG; BURKERT S.A.S.

( * ) Notice: Subject to any disclaimer, the term of this patent is extended or adjusted under 35 U.S.C. 154(b) by 274 days.

(21) Appl. No.: 16/846,253

(22) Filed: Apr. 10, 2020

(65) Prior Publication Data
US 2020/0332917 A1 Oct. 22, 2020

(30) Foreign Application Priority Data

Apr. 16, 2019 (DE) .................. 10 2019 110 073.9

(51) Int. Cl.
| | |
|---|---|
| *F16K 37/00* | (2006.01) |
| *F16K 47/00* | (2006.01) |
| *F16K 25/02* | (2006.01) |
| *G01F 1/36* | (2006.01) |
| *F16L 55/027* | (2006.01) |
| *G01F 15/00* | (2006.01) |
| *G01F 1/40* | (2006.01) |
| *G05D 7/01* | (2006.01) |

(52) U.S. Cl.
CPC .......... *F16K 37/0091* (2013.01); *F16K 25/02* (2013.01); *F16K 47/00* (2013.01); *F16L 55/02718* (2013.01); *G01F 1/36* (2013.01); *G01F 1/40* (2013.01); *G01F 15/00* (2013.01); *G01F 15/003* (2013.01); *G05D 7/01* (2013.01); *G01F 15/005* (2013.01)

(58) Field of Classification Search
CPC ...... F16K 37/0091; F16K 25/02; F16K 47/00; F16L 55/02718; G01F 1/36; G01F 1/40; G01F 15/00; G01F 15/003; G01F 15/005; G05D 7/01
USPC ................... 138/40–46; 73/861.52, 202–203
See application file for complete search history.

(56) References Cited

U.S. PATENT DOCUMENTS

| | | | | |
|---|---|---|---|---|
| 3,504,542 A | * | 4/1970 | Blevins ................ | A61B 5/087 600/529 |
| 3,780,767 A | * | 12/1973 | Borg ...................... | F16K 47/08 137/625.37 |
| 3,851,526 A | * | 12/1974 | Drexel .................... | G01F 5/00 73/202 |
| 4,450,718 A | * | 5/1984 | Hartemink .............. | F15D 1/04 73/202 |

(Continued)

FOREIGN PATENT DOCUMENTS

| | | | | |
|---|---|---|---|---|
| EP | 2365412 | | 9/2011 | ............... G05D 7/06 |
| JP | 2013127443 | | 6/2013 | ............... G01F 1/00 |

*Primary Examiner* — John Bastianelli
(74) *Attorney, Agent, or Firm* — Hayes Soloway P.C.

(57) ABSTRACT

A flow resistance insert of a flow rate measuring or flow rate control has contiguous discs between which at least one central axial flow duct is formed from which radial flow ducts branch off. The discs include alternating first discs and second discs. While the first discs are circumferentially closed ring discs, the second discs are circumferentially slotted one-piece ring discs.

7 Claims, 5 Drawing Sheets

(56) References Cited

U.S. PATENT DOCUMENTS

| | | | | |
|---|---|---|---|---|
| 4,497,202 | A * | 2/1985 | Mermelstein | G01F 1/6847 |
| | | | | 73/202 |
| 4,684,254 | A * | 8/1987 | Goudy, Jr. | B01F 33/05 |
| | | | | 48/189.4 |
| 5,357,793 | A | 10/1994 | Jouwsma | G01F 5/00 |
| 5,672,821 | A * | 9/1997 | Suzuki | G01F 5/005 |
| | | | | 73/202 |
| 5,819,803 | A * | 10/1998 | Lebo | F16K 47/08 |
| | | | | 138/40 |
| 6,026,859 | A * | 2/2000 | Wears | F16K 47/08 |
| | | | | 137/625.33 |
| 7,198,201 | B2 * | 4/2007 | Bowman | B05B 1/3436 |
| | | | | 239/596 |
| 8,485,227 | B2 * | 7/2013 | Chalupa | G01F 5/00 |
| | | | | 138/44 |
| 8,980,200 | B2 * | 3/2015 | Fox | G01N 15/1404 |
| | | | | 422/524 |
| 8,997,586 | B2 * | 4/2015 | Arnold | G01F 1/6842 |
| | | | | 73/861.351 |
| 9,638,562 | B2 * | 5/2017 | Wiedemann | H01R 13/5804 |
| 2006/0086194 | A1 | 4/2006 | Olin et al. | G01F 1/37 |
| 2013/0220443 | A1 | 8/2013 | Landry et al. | F16K 47/08 |
| 2015/0013792 | A1 | 1/2015 | Yasuda | F16L 55/02718 |

* cited by examiner

FLOW RESISTANCE INSERT AND A FLOW RATE MEASURING OR FLOW RATE CONTROL MEANS

FIELD OF THE INVENTION

The invention relates to a flow resistance. Insert of a flow rate measuring or flow rate control means having contiguous discs which together form at least one central axial flow duct in their interior.

Furthermore, the invention also relates to a flow rate measuring or flow rate control means having such a flow resistance insert.

BACKGROUND

Several types of flow rate measuring and flow rate control means are known, which operate with different measuring methods. One of these measuring methods and control methods uses pressure differential measurement. Usually, two ducts are branched off from a main flow duct between which a flow resistance insert, at which a defined pressure drops, is arranged in the main flow duct. The differential pressure is then determined using various possible methods, for example a differential pressure cell which is adapted to be pressurized from two sides.

It is important that the flow resistance insert is replaceable in order to be able to insert different inserts into the corresponding housing, wherein the insert must furthermore be manufactured within very narrow tolerances in order to achieve the desired flow resistance within narrow limits. To this end. It must be possible to manufacture the flow duct(s) passing through the insert in an accurate manner in terms of their position, their cross-section and their course. A common flow resistance insert is a so-called laminar flow element, in which numerous parallel, usually equally sized axial ducts pass through a cylindrical insert. An alternative to this is offered by inserts consisting of contiguous discs which form not only a central axial flow duct but also one or more radial flow ducts which branch off from the at least one central axial flow duct and deflect the flow radially outwards. Such a flow resistance insert leads to flow resistances which can be more or less high.

The object of the invention is to find a flow resistance insert which can be manufactured in a simple and accurate manner.

SUMMARY

The present invention provides a flow resistance insert of a flow rate measuring or flow rate control means having contiguous discs which together form in their interior at least one central axial flow duct from which radial flow ducts branch off, the discs including first discs which alternate with second discs, and the first discs being circumferentially closed ring discs and the second, likewise one-piece discs being circumferentially slotted, one-piece ring discs to form the radial flow ducts.

The flow resistance insert according to the invention includes two types of discs, both of which are flat. The closed peripheral ring discs completely close the central flow duct(s) to the side, whereas the second discs are single or multiple slotted. The slot(s) then form the lateral flow ducts so that fluid from the central flow duct(s) can exit the flow resistance insert laterally outwards. As the second discs are made in one piece, it is not necessary to assemble them from several parts, which reduces assembly and also eliminates the need to align fragments of the second discs. The lateral ducts can thus be manufactured in a very accurate manner in terms of position and dimensions.

The second disks may have one, two or more slots, in particular also four slots at the circumference, and the resulting circumferential segments, which are produced between adjacent slots, are coupled to each other by at least one connecting web. This connecting web is an integral part of the second discs and extends through the axial flow duct to connect the circumferential segment(s) of a slotted ring disc.

The connecting web then naturally divides the central axial flow duct over its axial length into two or more flow ducts depending on the number and the course of the connecting webs.

As just mentioned, two or more connecting webs may be provided, which can cross each other in the area of the axial flow duct and merge into each other.

In an axial view, the connecting webs are in particular arranged symmetrically, in particular point-symmetrically to the imaginary central axis of the flow resistance insert, this being only an option.

In order to achieve a flow as laminar as possible in the axial direction, the radial thickness of the peripheral ring of the first discs and the radial thickness of the circumference of the circumferential segments of the second discs can correspond to each other, i.e. be equal. Therefore, there is no jump in cross-section from a first disc to a contiguous second disc in the radial direction in the area of the ring.

The axial thickness of the first discs may be greater than that of the second discs, so that the axial dimension of the respective lateral duct formed by a slot is small.

One example for the present invention is that the second discs have a thickness of 0.03 to 0.08 mm and that the thickness of the first discs is greater than 0.1 mm.

In particular stainless steel, for example having the designation 1.4404, is provided as a material.

The first and second discs obtain their slots or openings and thus ducts in particular by photochemical etching. The outer circumference is preferably also etched.

In order to manufacture the thickness in particular of the thinner second discs with little effort and in a very accurate manner, a high-precision steel strip is selected as the starting material, which is then only etched photochemically. A corresponding package of adjacent, i.e. directly contiguous second discs is then turned in alignment with each other.

Generally, the connecting web(s) increase the stability of the second discs, which is also important to avoid an unwanted deformation of the second discs by pressing the first and second discs together in the axial direction, which could cause unwanted leaks between discs. The first discs must also be stable so that when the discs are pressed together, they do not deform and are thus pressed into the flow duct(s). This would lead to a change in pressure loss. The second discs do not deform when pressed together due to the connecting web.

The first and second discs optionally all have axial screw holes, screw holes being present from disc to disc, which are aligned with each other and which together then form a fastening opening. The discs are pressed axially against each other via these fastening openings and can additionally be aligned with each other in the circumferential direction.

In order to obtain a high stability of the second discs, despite the slot(s) and the screw holes, each screw hole of the second disc can be located in a radial prolongation of an associated connecting web because in this area, the corresponding circumferential segment of the second disc is stable due to the connecting web.

The first and the second discs which are all alternately directly contiguous to each other in a flat manner form a package.

Preferably, an end element which prevents fluid from flowing axially through the insert is contiguous to one axial end of the package, and at the opposite end a pipe having a central supply connected duct to the central axial flow duct, the end element and the pipe being screwed together and clamping the package therebetween. The end element prevents the fluid from flowing axially through the insert, so that the fluid flows from the central axial flow duct(s) via the lateral flow ducts out of the insert.

The insert is an inherently stable component which is adapted to be supplied as a unit and to be inserted as a unit into the flow rate measuring or flow rate control means.

As already mentioned in the introductory part, the invention also relates to a flow rate measuring or flow rate control means for a fluid, having a housing which includes a fluid duct into which a flow resistance insert according to the invention is inserted. A lateral, in particular radial first duct located upstream of the discs branches off from the fluid duct. Furthermore, a second duct is provided radially to the discs, which is in particular designed as a ring duct and into which the lateral or radial ducts formed by the slots in the second discs then open.

DETAILED DESCRIPTION

Figure 1:
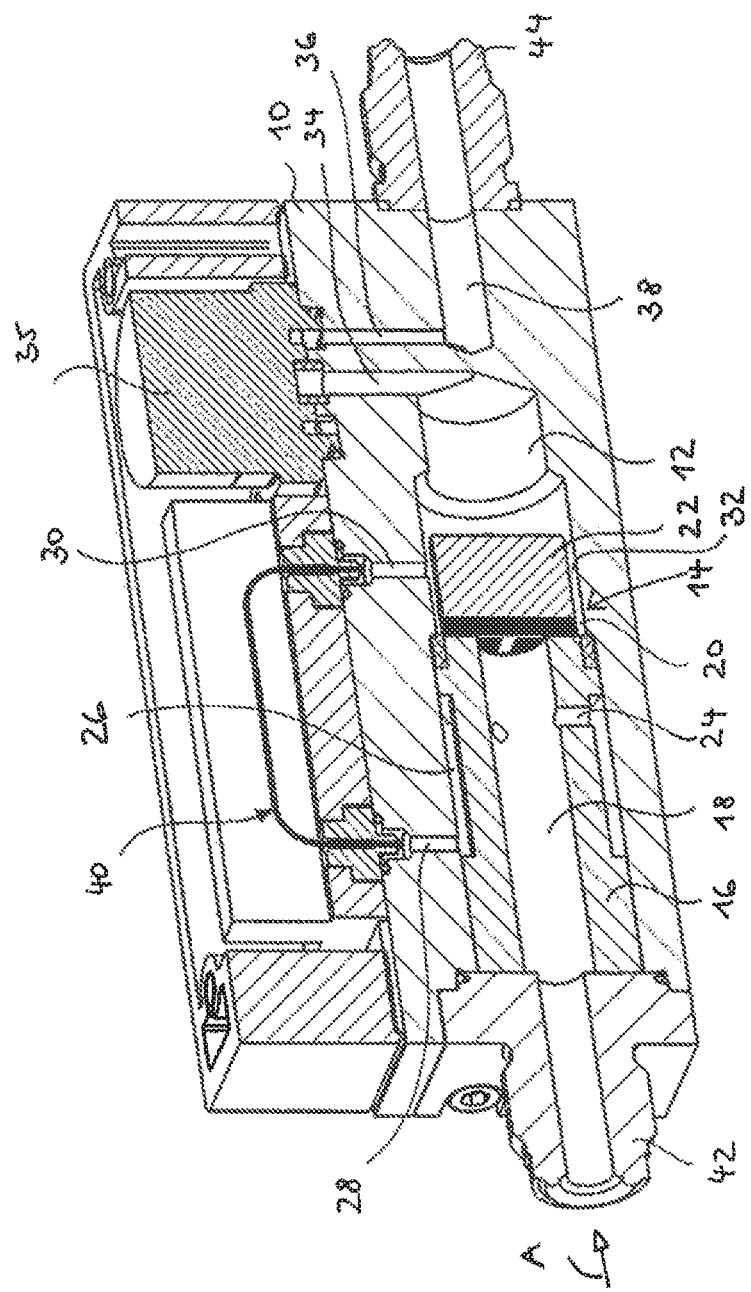
FIG. 1 shows a cross-sectional view through a flow rate measuring or flow rate control means according to the invention having with built-in flow resistance insert according to the invention.

FIG. 1 shows a flow rate measuring and/or flow rate control means for fluids which has a housing 10 including a fluid duct 12 which is designed as a blind hole and extends in the axial direction.

Figure 2:
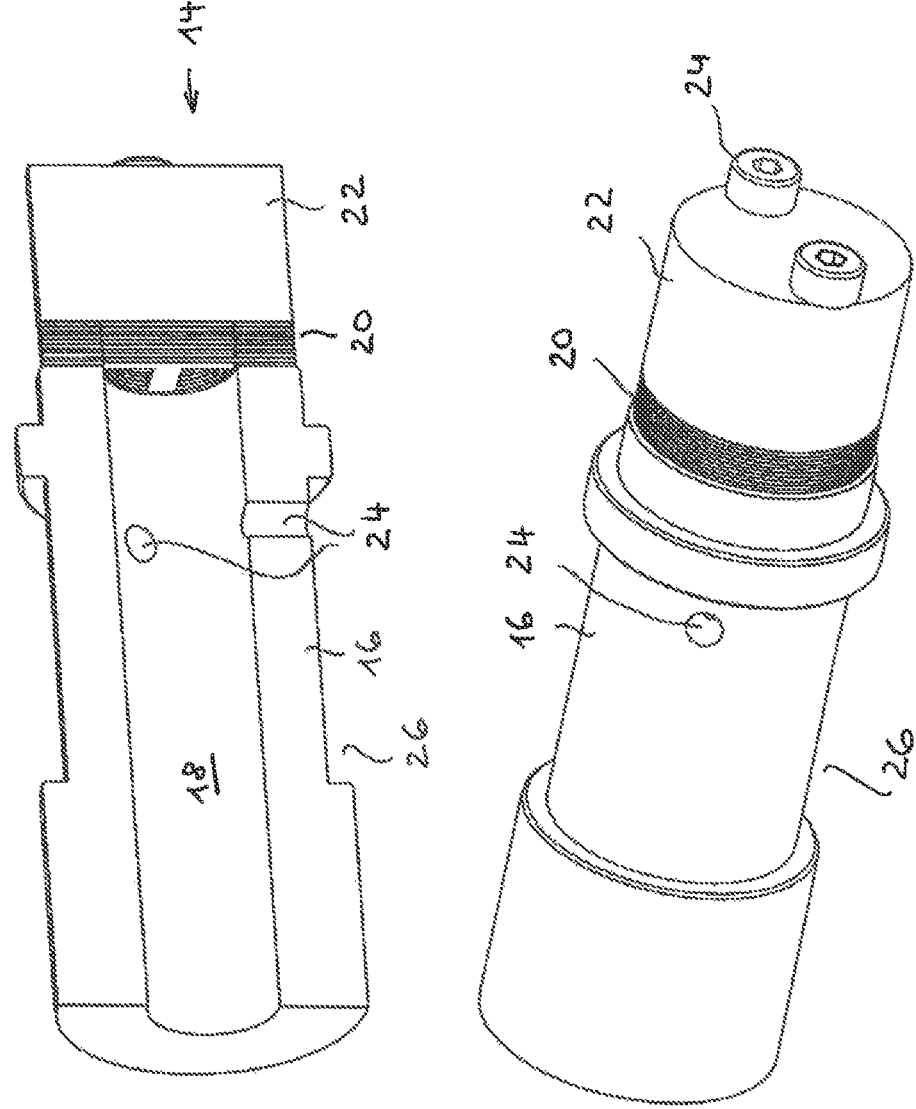
FIG. 2 shows a longitudinal sectional view and a perspective view of the flow resistance insert shown in FIG. 1.

A flow resistance insert 14 which is shown in more detail in FIG. 2 and which is designed as a pre-assembled unit is inserted into the fluid duct 12, the flow resistance insert including in succession in the direction of flow (see arrow A) a pipe 16 having a central inlet duct 18 extending axially through the entire pipe 16. Downstream, a package 20 of discs which are contiguous to each other over their entire surface adjoins the respective end face of the pipe 16. Downstream of the package 20, a particularly cylindrical end element 22 which cannot be flown through is in turn contiguous to this package.

With reference to the perspective view, FIG. 2 in particular shows that the end element 22 is screwed to the pipe 16 by means of screws 24 extending through the package 20 and, along with the pipe 18, clamps the package axially therebetween.

Upstream of the package 20, the tube 16 has one or more lateral, in particular radial openings 24 which extend up to a circumferential groove 26, which forms a ring duct, which in turn is delimited by the housing 10 at the outer circumference.

The housing 10 has an upstream first lateral, in particular radial duct 28 and a second duct 30 which extends downstream of the package 20 also in a lateral, in particular radial manner, the ducts 28, 30 being part of a bypass.

The end element 22 has an outer dimension which is smaller than the corresponding area of the fluid duct 12, such that a ring duct 32 is in turn formed at the outer circumference thereof, which also extends radially laterally to the package 20, as the package 20 also has outer dimensions which are smaller than the corresponding section of the wall section of the housing 10 forming the fluid duct 12.

In particular, the external dimensions of the discs and of the end element are identical.

A third duct 34 branches off from the fluid duct 12 at the axial end thereof and leads to an electrically actuatable fluid control valve 35, from which a lateral fourth duct 36 in turn leads back into the housing 10 and to an outlet fluid duct 38.

A fluid rate measuring means 40 which may be designed in various ways, for example a means for measuring the differential pressure of the fluid in the ducts 28, 30 acts and is seated between the ducts 28 and 30. Other possibilities, such as thermal measuring methods, may also be provided here.

In the variant shown, the means according to FIG. 1 acts as a flow rate control means, because it is possible to measure the fluid in the fluid measuring means 40 and therefrom to determine the flow velocity thereof or the like, for example. Based on this data, the fluid control valve 35 can then be actuated to control or regulate the flow rate of fluid through the ducts 34, 36 and 38.

If the device is only to be set up as a flow rate measuring means for fluid, the fluid control valve 35 and, if necessary, also the ducts 34, 36 can be omitted, so that the outlet fluid duct 38 is in flow connection with the fluid duct 12.

Alternatively, to create a modular system, the ducts 34, 36 may also be coupled to each other via a U-shaped connecting duct attached at their ends to the housing 10.

An inlet connection 42 and an outlet connection 44 may also be provided upstream of the fluid duct 12 and downstream of the outlet fluid duct 38.

Figure 3:
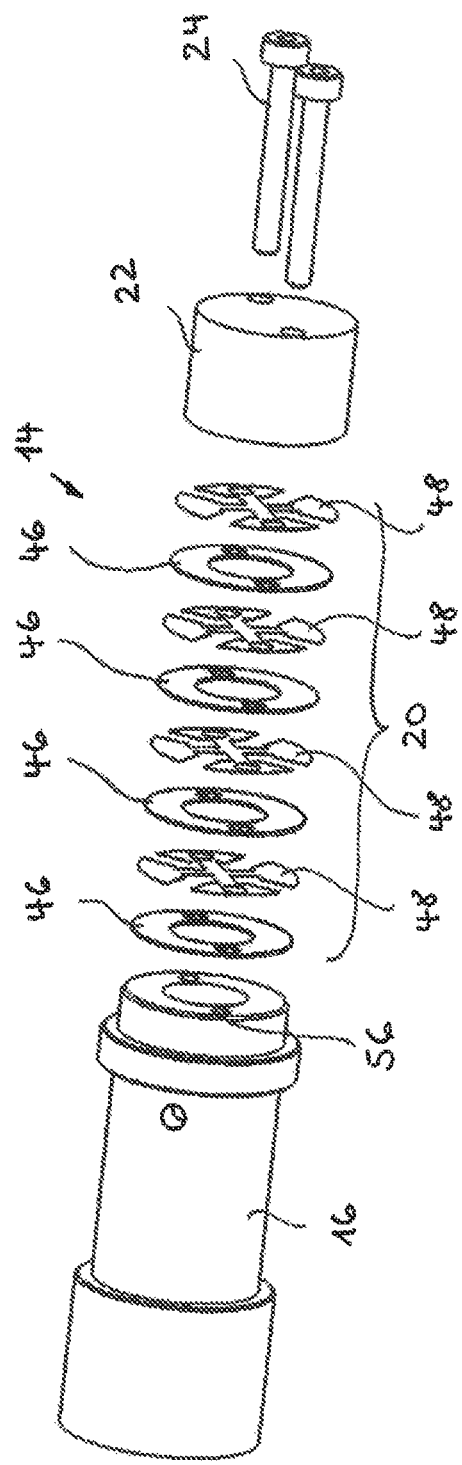
FIG. 3 shows an exploded view of the flow resistance insert of FIG. 2.

FIG. 3 shows the flow resistance insert 14 in an exploded view.

It comprises several discs which are respectively flat and even and which are contiguous to each other in a flat manner with their flat end faces.

The discs comprise identically designed first discs 46 and intermediate second discs 48, which are preferably also designed identically, i.e. which can or should have the same dimensions and geometries.

Figure 8:
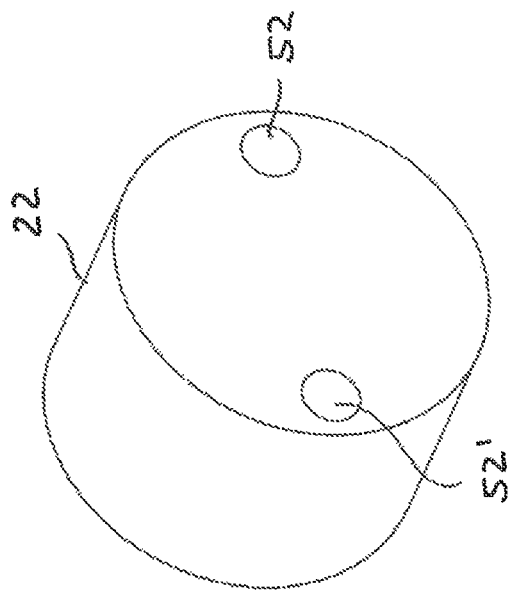
FIG. 8 shows a perspective top view of an end element of the flow resistance insert according to the invention.
Figure 7:
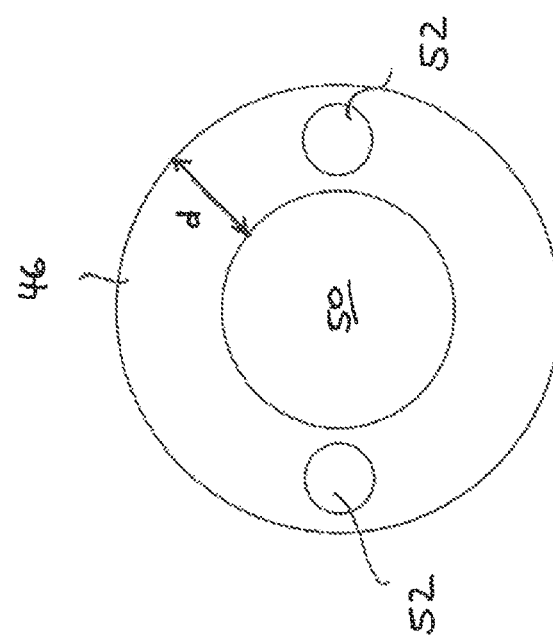
FIG. 7 shows a top view of a so-called first disc of the flow resistance insert according to the invention located between the discs of FIGS. 4 to 6.

The first discs 46 are circumferentially closed ring discs, one of which is shown in FIG. 7. The disc 46 has a ring thickness d measured in the radial direction, which is uniform and of equal size at the circumference and which has a central opening 50. Furthermore, several screw holes 52 are provided, which are aligned with screw holes 52' in the end piece 22, which is again shown separately in FIG. 8.

Figure 4:
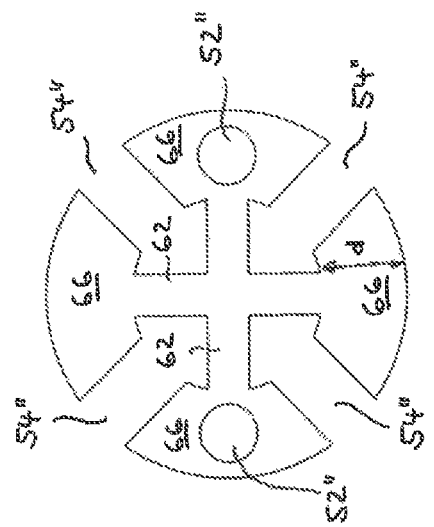
FIG. 4 shows a top view of a variant of one of the disc of the flow resistance insert according to the invention.
Figure 5:
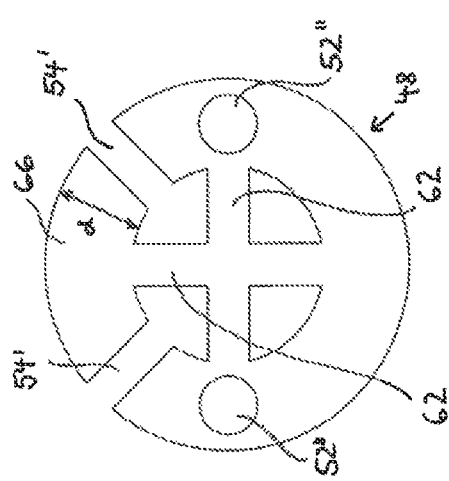
FIG. 5 shows a top view of a further variant of one of the discs of the flow resistance insert according to the invention, FIG. 6 again shows a further variant of a disc of the flow resistance insert according to the invention.
Figure 6:
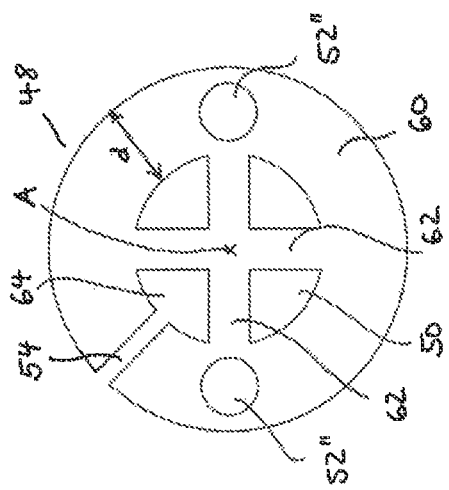

FIGS. 4 to 6 show various optional second discs 48 which are adapted to be inserted in a package 20, wherein also here, one disc 48 may be arranged between two first discs 48, or between a first disc 46 and the end element 22, or between a first disc 46 and the end face of the pipe 16, and may be clamped axially in a flat manner therebetween.

The variant of the second disc 48 shown in FIG. 4 also has screw holes 52" which are aligned with the screw holes 52 and 52' in the assembled state, so that they together form a fastening opening for the passage of the fastening screws 24.

The tube 16 has threads 56 which are accessible at the end face (see FIG. 3) and into which the fastening screws 24 can be screwed.

The second discs 46 are also ring discs, having an outer circumferentially extending ring, the thickness d of which is equal to the thickness d of the first discs 46, just as the outer diameter or the external dimensions correspond to those of the first disc 46.

However, in contrast to the first disc 46, the second discs 48 are slotted at the circumference.

In the embodiment according to FIG. 4, a single lateral, here radial slot 54 is provided, which extends through the entire circumferentially extending ring section 60.

The central opening 50 is divided by two cross-shaped webs 62 running through the central centre A into several, here into four ducts, the slot 54 starting from one duct 64. It is also possible to provide only one web.

It should also be noted in this embodiment that the screw holes 52" are located in the radial prolongation of the connecting web 62, which here extends horizontally, which is an option.

The connecting webs 62 are an integral part of the entire second disc 48 and stabilize the ring section 60.

In the package 20 itself, a central axial flow duct is formed by the central opening 50 in the first discs 46 and by the subdivided central opening 50 in the second discs 48, which is partially, namely in the area of the second discs 48, divided into several central flow ducts which then open again into a common section of the flow duct as soon as the next first disc 46 is reached.

The embodiment according to FIG. 5 differs from that according to FIG. 4 in that two radial or more generally lateral slots 54' are provided which, in the assembled state, then fluidically connect the central flow duct to the ring duct 32.

In this embodiment, a circumferential segment 66 is created which is connected in one piece to the rest of the second disc 48, i.e. to another circumferential segment only by the web 62 which runs vertically here. However, the second disc 48 is again designed in one piece.

The vertically extending web 62 corresponds to the vertically extending web 62 according to FIG. 4, and the screw holes 52" adjoin the prolongation thereof.

The embodiment according to FIG. 6 in turn differs from that according to FIG. 5 in that four lateral, in particular radial slots 54" are provided here, which are preferably, but not necessarily, evenly distributed at the circumference, i.e. are spaced apart at an angle of 90°.

The resulting circumferential segments 66 are in turn connected to each other by associated webs 62.

In all embodiments, which is also only provided as an option, the connecting webs 62 cross each other and are also distributed symmetrically with respect to the axial view which also corresponds to the top view. The radial thickness d in these embodiments is as large as that of the associated, adjacent first discs 46.

Optionally, the first discs 46 could of course also have one or more webs 62.

The axial thickness of the first discs 46 is preferably greater, in particular greater by at least a factor of 2 than that of the second discs 48.

Both the first and the second discs 46, 48 are preferably formed from a flat sheet, and their openings 50 may be created by photochemical etching, for example.

The formation of the second disks 48 is of course not limited only to the variants shown. However, it is important that the second disks are all formed in one piece, so that no individual parts for segments are created.

The invention claimed is:

1. A flow resistance insert of a flow rate measuring or flow rate control, having contiguous discs which together form in their interior at least one central axial flow duct from which radial flow ducts branch off, the discs including first discs which alternate with second discs, and the first discs being circumferentially closed ring discs, and the second discs being circumferentially slotted one-piece ring discs to form the radial flow ducts, wherein the first and second discs have an outer circumferentially extending ring of the same radial thickness, wherein the second discs have, one, two or more slots at the circumference which form the radial flow ducts and which separate the circumferentially extending into circumferential segments that are coupled to each other b at least one connecting web, the connecting webs extending through the axial flow duct and cross each other in the area of the axial flow duct and merge into each other, and wherein in an axial view, the connecting webs are distributed symmetrically.

2. The flow resistance insert according claim 1, wherein the axial thickness of the first discs is greater than that of the second discs, wherein the thickness of the first discs is greater than 0.1 mm and wherein second discs have a thickness of 0.03 mm to 0.08 mm.

3. The flow resistance insert according claim 1, wherein the first and the seconds discs have axial screw holes which are aligned with each other from disc to disc and together form at least one fastening opening.

4. The flow resistance insert according to claim 3, wherein each screw hole in the second disc is arranged in the circumferentially extending ring in a radial prolongation of a connecting web.

5. The flow resistance insert according claim 1, wherein at an axial, downstream end, an end element which prevents fluid from flowing axially through the insert, and at an opposite end, a tube having a central supply duct connected to the central axial flow duct adjoin a package formed by the directly contiguous discs, the end element and the tube being screwed together and clamping the package therebetween.

6. A flow rate measuring or flow rate control having a housing which includes
 a flow resistance insert as claimed in claim 1,
 a fluid duct into which a flow resistance insert is inserted,
 a lateral, first duct located upstream of the discs branching off from the fluid duct, and
 a second, lateral duct being provided laterally inline to the end element.

7. A flow resistance insert according to claim 1, wherein the second discs are made of photochemically etched steel.

* * * * *